US 6,529,903 B2

(12) United States Patent
Smith et al.

(10) Patent No.: US 6,529,903 B2
(45) Date of Patent: Mar. 4, 2003

(54) METHODS AND APPARATUS FOR USING A MODIFIED INDEX TO PROVIDE SEARCH RESULTS IN RESPONSE TO AN AMBIGUOUS SEARCH QUERY

(75) Inventors: Benjamin Thomas Smith, Mountain View, CA (US); Sergey Brin, Palo Alto, CA (US); Sanjay Ghemawat, Mountain View, CA (US); Christopher D. Manning, Palo Alto, CA (US)

(73) Assignee: Google, Inc., Mountain View, CA (US)

( * ) Notice: Subject to any disclaimer, the term of this patent is extended or adjusted under 35 U.S.C. 154(b) by 214 days.

(21) Appl. No.: 09/748,833

(22) Filed: Dec. 26, 2000

(65) Prior Publication Data

US 2002/0042791 A1 Apr. 11, 2002

Related U.S. Application Data

(60) Provisional application No. 60/216,530, filed on Jul. 6, 2000.

(51) Int. Cl.[7] ............................................. G06F 17/30
(52) U.S. Cl. ..................... 707/7; 707/5; 707/3
(58) Field of Search ........................ 707/7, 5, 3, 100, 707/101

(56) References Cited

U.S. PATENT DOCUMENTS

| | | | | |
|---|---|---|---|---|
| 5,495,608 A | * | 2/1996 | Antoshenkov | 707/1 |
| 5,701,469 A | * | 12/1997 | Brandli et al. | 707/102 |
| 5,745,894 A | * | 4/1998 | Burrows et al. | 707/5 |
| 5,758,145 A | * | 5/1998 | Bhargava et al. | 707/2 |
| 5,845,273 A | * | 12/1998 | Jindal | 707/1 |
| 5,915,251 A | * | 6/1999 | Burrows et al. | 707/102 |
| 5,953,073 A | * | 9/1999 | Kozina et al. | 348/558 |
| 5,978,792 A | * | 11/1999 | Bhargava et al. | 707/2 |
| 6,026,411 A | * | 2/2000 | Delp | 707/104 |
| 6,038,365 A | * | 3/2000 | Yamagami | 707/6 |
| 6,169,999 B1 | * | 1/2001 | Kanno | 707/532 |
| 6,353,820 B1 | * | 4/2002 | Edwards | 707/2 |
| 6,377,961 B1 | * | 4/2002 | Ryu | 707/100 |
| 6,421,662 B1 | * | 7/2002 | Karten | 707/3 |

OTHER PUBLICATIONS

Santuci et al., A Hypertabular Visualizer of Query Results, 1977, IEEE, pp. 189–196.*

Graefe et al., The Microsoft Relational Engine, 1996, IEEE, Pates 160–161.*

* cited by examiner

*Primary Examiner*—Frantz Coby
(74) *Attorney, Agent, or Firm*—Straub & Pokotylo; John C. Pokotylo

(57) ABSTRACT

A system allows a user to submit an ambiguous search query and to receive potentially disambiguated search results. In one implementation, a search engine's conventional alphanumeric index is translated into a second index that is ambiguated in the same manner as which the user's input is ambiguated. The user's ambiguous search query is compared to this ambiguated index, and the corresponding documents are provided to the user as search results.

21 Claims, 8 Drawing Sheets

DOCUMENT 1: CAR REPAIR, CAR RENTAL, 3

DOCUMENT 2: VIDEO RENTAL

DOCUMENT 3: WINE, CHAMPAGNE, BAR ITEMS

| TERM | LOCATION (DOCUMENT) |
|---|---|
| 3 | DOCUMENT 1 |
| BAR | DOCUMENT 3 |
| CAR | DOCUMENT 1 |
| CHAMPAGNE | DOCUMENT 3 |
| ITEMS | DOCUMENT 3 |
| RENTAL | DOCUMENTS 1 AND 2 |
| REPAIR | DOCUMENT 1 |
| VIDEO | DOCUMENT 2 |
| WINE | DOCUMENT 3 |

FIG. 4A

| TERM | LOCATION (DOCUMENT) |
|---|---|
| 3 | DOCUMENT 1 |
| 227 | DOCUMENTS 1 AND 3 |
| 242672463 | DOCUMENT 3 |
| 48367 | DOCUMENT 3 |
| 736825 | DOCUMENTS 1 AND 2 |
| 737247 | DOCUMENTS 1 |
| 84336 | DOCUMENT 2 |
| 8463 | DOCUMENT 3 |

FIG. 5C

METHODS AND APPARATUS FOR USING A MODIFIED INDEX TO PROVIDE SEARCH RESULTS IN RESPONSE TO AN AMBIGUOUS SEARCH QUERY

RELATED APPLICATION

This application claims priority under 35 U.S.C. §119(e) based on U.S. Provisional Application Ser. No. 60/216,530, entitled DATA ENTRY AND SEARCH FOR HANDHELD DEVICES, filed on Jul. 6, 2000, the disclosure of which is herein incorporated by reference in its entirety.

BACKGROUND OF THE INVENTION

A. Field of the Invention

This invention relates generally to methods and apparatus for providing search results in response to an ambiguous search query provided by a user.

B. Description of the Related Art

Most search engines operate under the assumption that the end user is entering search queries using something like a conventional keyboard, where the input of alphanumeric strings is not difficult. As small devices become more common, however, this assumption is not always valid. For example, users may query search engines using a wireless telephone that supports the WAP (Wireless Application Protocol) standard. Devices such as wireless telephones typically have a data input interface wherein a particular action by the user (e.g., pressing a key) may correspond to more than one alphanumeric character. A detailed description of WAP architecture is available at http://www1.wapforum.org/tech/documents/SPEC-WAPArch-19980439.pdf ("WAP 100 Wireless Application Protocol Architecture Specification").

In the usual case, the WAP user navigates to the search query page, and is presented with a form into which they input their search query. With conventional methods, the user may be required to press multiple keys to select a particular letter. On a standard telephone keypad, for example, the user would select the letter "b" by pressing the "2" key twice, or would select the letter "s" by pressing the "7" key four time. Accordingly, to enter a query for "ben smith", the user would ordinarily need to enter the following string of keypresses: 2233660777764444844, which map to letters as follows:

22-→b
33-→e
66-→n
0-→space
7777-→s
6-→m
444-→i
8-→t
44-→h

After the user has entered their search request, the search engine receives the word or words from the user, and proceeds in much the same manner as if it had received the request from a desktop browser wherein the user employed a conventional keyboard.

As can be seen from the foregoing example, this form of data entry is inefficient in that it requires eighteen keystrokes to enter the nine alphanumeric characters (including the space) corresponding to "ben smith". Others have attempted to overcome the limitations imposed by reduced data entry devices, but each of the existing approaches has shortcomings. There remains, therefore, a need for methods and apparatus for providing relevant search results in response to an ambiguous search query.

SUMMARY OF THE INVENTION

Methods and apparatus consistent with the present invention, as embodied and broadly described herein, provide relevant search results in response to an ambiguous search query. Consistent with the invention, a method of providing search results to a user in response to an ambiguous search query includes generating a first index that associates (1) a first set of information of a first type with (2) documents that correspond to the first set of information. The first set of information is translated into a second set of information of a second type, based on mapping information. A second index is generated that associates, based on the mapping information, (1) the second set of information with (2) the documents. A search query of the second type is received, and search results are generated by comparing the search query to the second index. The user is then presented with these search results.

BRIEF DESCRIPTION OF THE DRAWINGS

The accompanying drawings, which are incorporated in, and constitute a part of, this specification illustrate an embodiment of the invention and, together with the description, serve to explain the advantages and principles of the invention. In the drawings.

FIG. 4a illustrates a conventional alphanumeric index;

FIG. 5c illustrates a numeric index corresponding to the alphanumeric index.

DETAILED DESCRIPTION

Reference will now be made in detail to an embodiment of the present invention as illustrated in the accompanying drawings. The same reference numbers may be used throughout the drawings and the following description to refer to the same or like parts.

A. Overview

Methods and apparatus consistent with the invention allow a user to submit an ambiguous search query and to receive potentially disambiguated search results. A search engine's conventional alphanumeric index is translated into an ambiguated index using mapping information that is based on the form in which the user's input is ambiguated. The user's ambiguous search query is compared to this ambiguated index, and the corresponding documents are provided to the user as search results.

B. Architecture

Figure 1:
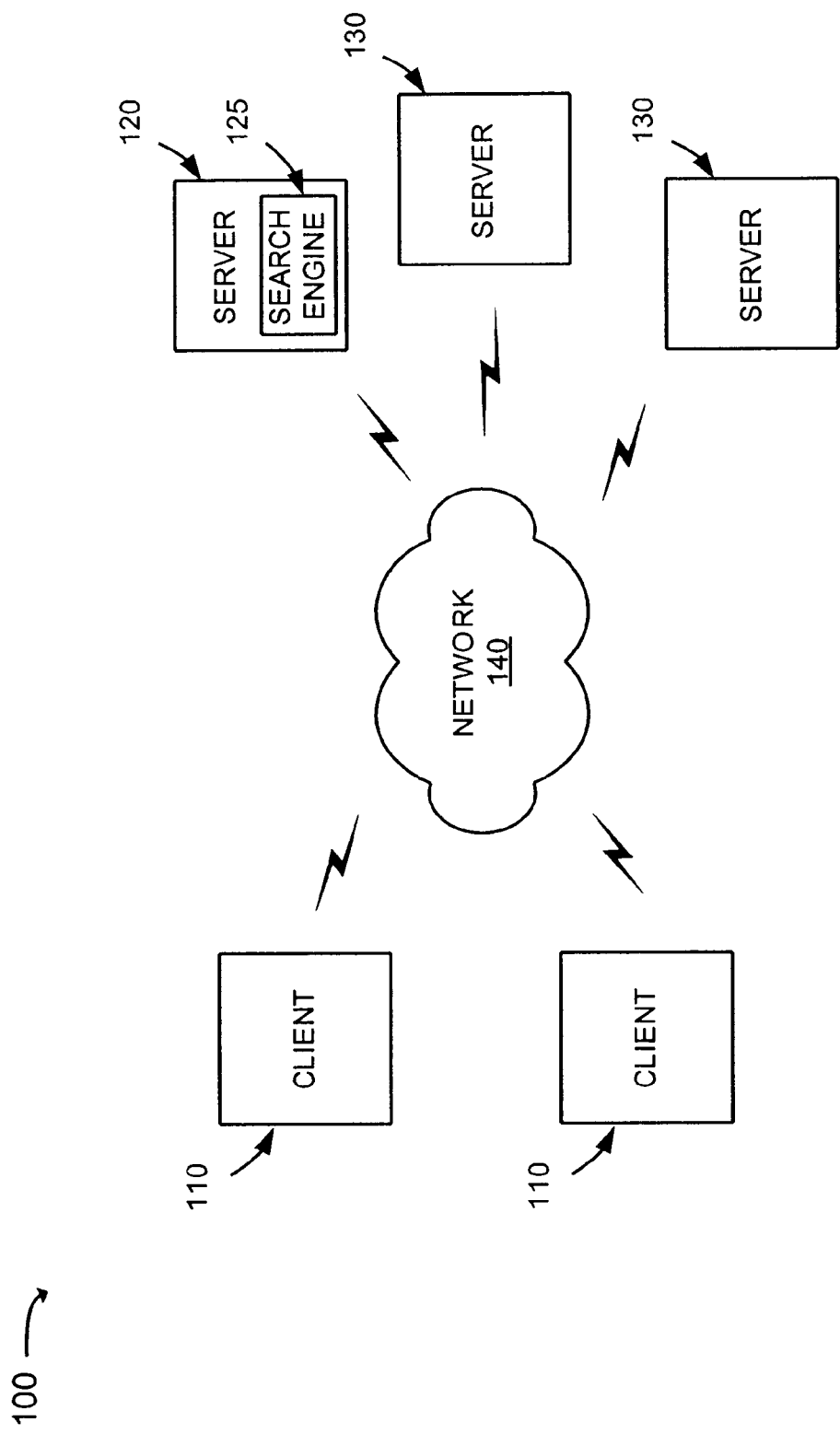
FIG. 1 illustrates a block diagram of a system in which methods and apparatus consistent with the present invention map be implemented.

FIG. 1 illustrates a system 100 in which methods and apparatus, consistent with the present invention, may be implemented. The system 100 may include multiple client devices 110 connected to multiple servers 120 and 130 via a network 140. The network 140 may include a local area network (LAN), a wide area network (WAN), a telephone network, such as the Public Switched Telephone Network (PSTN), an intranet, the Internet, or a combination of networks. Two client devices 110 and three servers 120 and 130 have been illustrated as connected to network 140 for simplicity. In practice, there may be more or less client devices and servers. Also, in some instances, a client device may perform the functions of a server and a server may perform the functions of a client device.

The client devices 110 may include devices, such mainframes, minicomputers, personal computers, laptops, personal digital assistants, or the like, capable of connecting to the network 140. The client devices 110 may transmit data over the network 140 or receive data from the network 140 via a wired, wireless, or optical connection.

Figure 2:
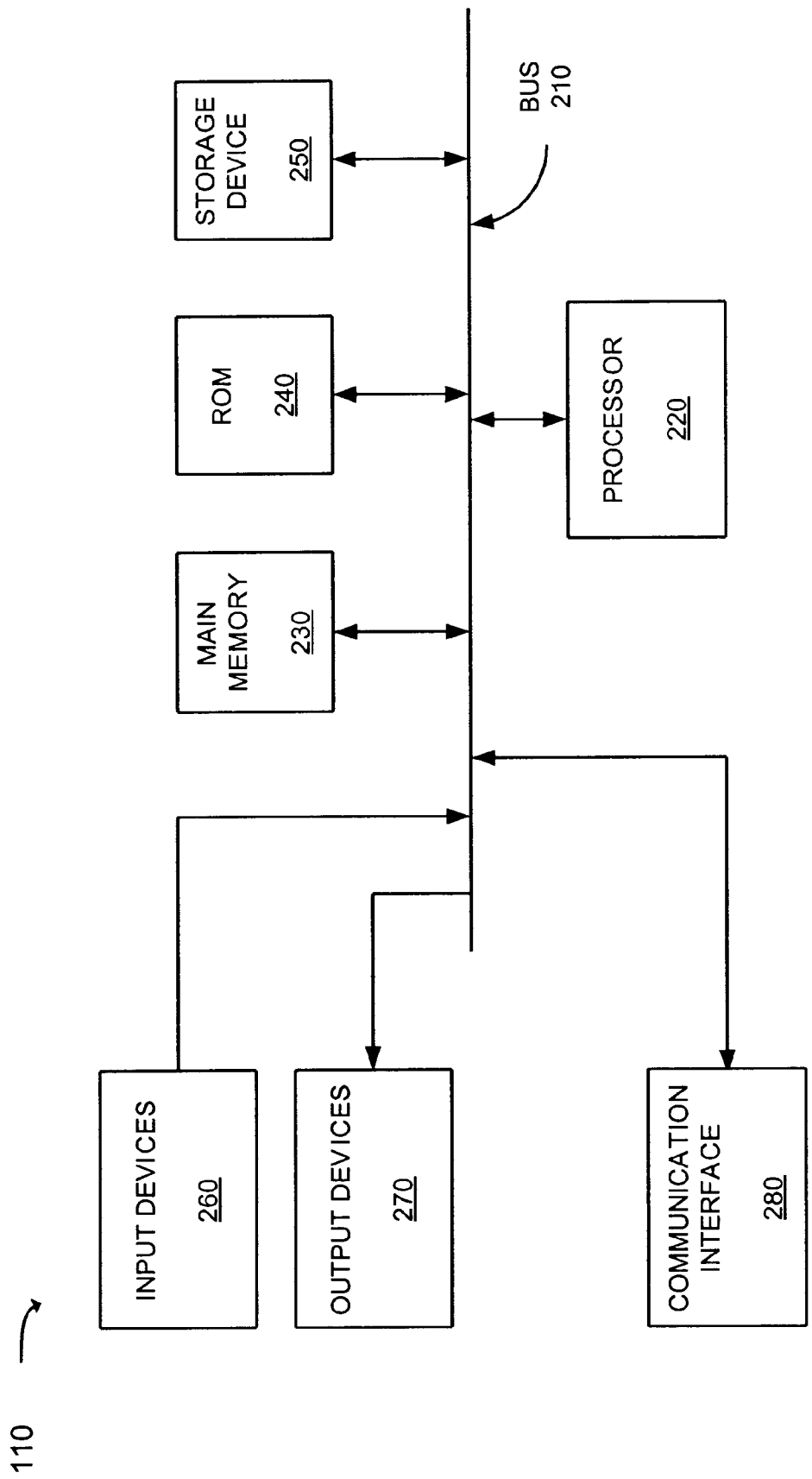
FIG. 2 illustrates a block diagram of a client device, consistent with the invention.

FIG. 2 illustrates an exemplary client device 110 consistent with the present invention. The client device 110 may include a bus 210, a processor 220, a main memory 230, a read only memory (ROM) 240, a storage device 250, an input device 260, an output device 270, and a communication interface 280.

The bus 210 may include one or more conventional buses that permit communication among the components of the client device 110. The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input device 260 may include one or more conventional mechanisms that permit a user to input information to the client device 110, such as a keyboard, a mouse, a pen, voice recognition and/or biometric mechanisms, etc. The output device 270 may include one or more conventional mechanisms that output information to the user, including a display, a printer, a speaker, etc. The communication interface 280 may include any transceiver-like mechanism that enables the client device 110 to communicate with other devices and/or systems. For example, the communication interface 280 may include mechanisms for communicating with another device or system via a network, such as network 140.

As will be described in detail below, the client devices 110, consistent with the present invention, perform certain searching-related operations. The client devices 110 may perform these operations in response to processor 220 executing software instructions contained in a computer-readable medium, such as memory 230. A computer-readable medium may be defined as one or more memory devices and/or carrier waves. The software instructions may be read into memory 230 from another computer-readable medium, such as the data storage device 250, or from another device via the communication interface 280. The software instructions contained in memory 230 causes processor 220 to perform search-related activities described below. Alternatively, hardwired circuitry may be used in place of or in combination with software instructions to implement processes consistent with the present invention. Thus, the present invention is not limited to any specific combination of hardware circuitry and software.

The servers 120 and 130 may include one or more types of computer systems, such as a mainframe, minicomputer, or personal computer, capable of connecting to the network 140 to enable servers 120 and 130 to communicate with the client devices 110. In alternative implementations, the servers 120 and 130 may include mechanisms for directly connecting to one or more client devices 110. The servers 120 and 130 may transmit data over network 140 or receive data from the network 140 via a wired, wireless, or optical connection.

The servers may be configured in a manner similar to that described above in reference to FIG. 2 for client device 110. In an implementation consistent with the present invention, the server 120 may include a search engine 125 usable by the client devices 110. The servers 130 may store documents (or web pages) accessible by the client devices 110.

C. Architectural Operation

Figure 3:
FIG. 3 illustrates a diagram depicting three documents.

FIG. 3 illustrates a diagram depicting three documents, which may be stored for example on one of the servers 130.

A first document (Document 1) contains two entries—"car repair" and "car rental"—and is numbered "2" at its bottom. A second document (Document 2) contains the entry "video rental". A third document (Document 3) contains three entries—"wine", "champagne", and "bar items"—and includes a link (or reference) to Document 2.

For the sake of illustrative simplicity, the documents shown in FIG. 3 only contain alphanumeric strings of information (e.g., "car", "repair", "wine", etc.). Those skilled in the art will recognize, however, that in other situations the documents could contain other types of information, such as phonetic, or audiovisual information.

FIG. 4a illustrates a conventional alphanumeric index, based on the documents shown in FIG. 3. The first column of the index contains a list of alphanumeric terms, and the second column contains a list of the documents corresponding to those terms. Some terms, such as the alphanumeric term "3", only correspond to (e.g., appear in) one document—in this case Document 1. Otherterms, such as "rental", correspond to multiple documents—in this case Documents 1 and 2.

Figure 4B:
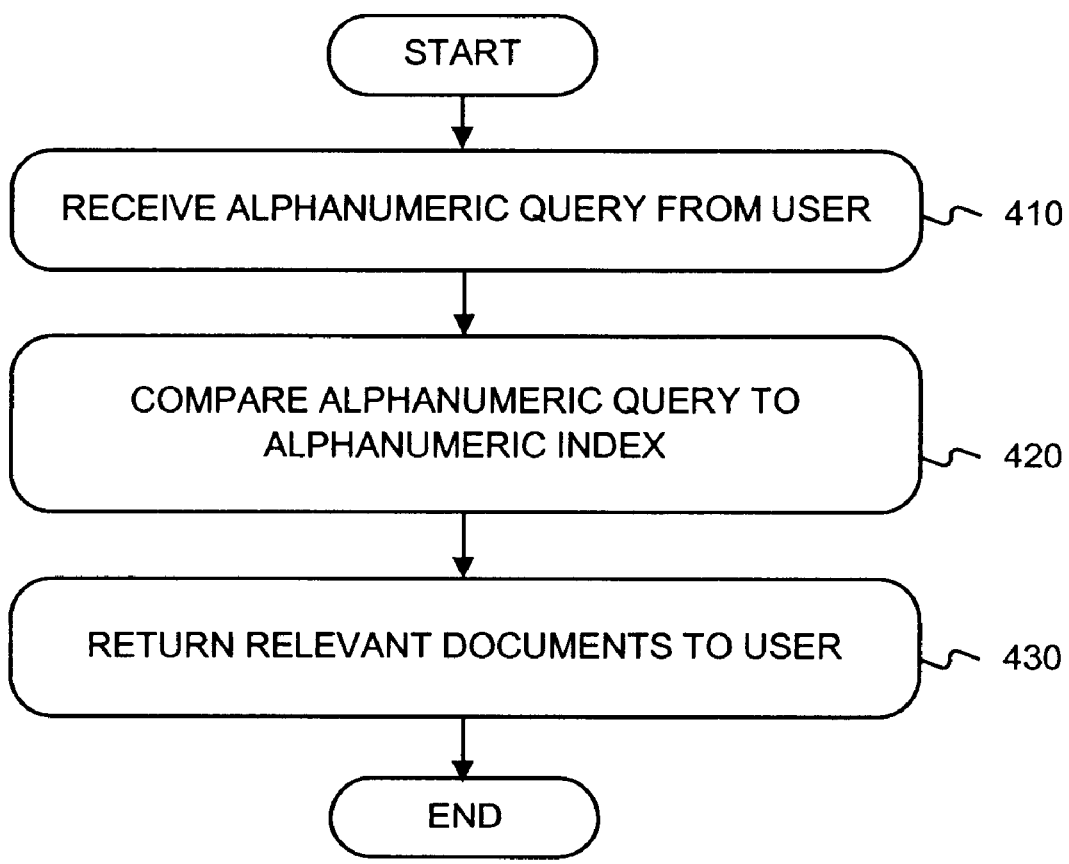
FIG. 4b illustrates a flow diagram for providing search results in response to a conventional alphanumeric search query.

FIG. 4b illustrates how a conventional search engine, such as search engine 125, would use the index illustrated in FIG. 4a to provide search results in response to an alphanumeric search query. The alphanumeric query may be generated using a conventional alphanumeric keyboard or by using any conventional mechanism. For purposes of illustration, FIG. 4b depicts two alphanumeric queries: "car" and "wine". Under a conventional approach, search engine 125 receives an alphanumeric query, such as "car" (stage 410), and uses the alphanumeric index to determine which documents correspond to that query (stage 420). In this example, a conventional search engine 125 would use the index illustrated in FIG. 4a to determine that "car" corresponds to Document 1 and would return Document 1 (or a reference to it) to the user as a search result. Similarly, a conventional search engine would determine that "wine" corresponds to Document 3 and would return Document 3 (or a reference to it) to the user (stage 430).

Figure 5A:
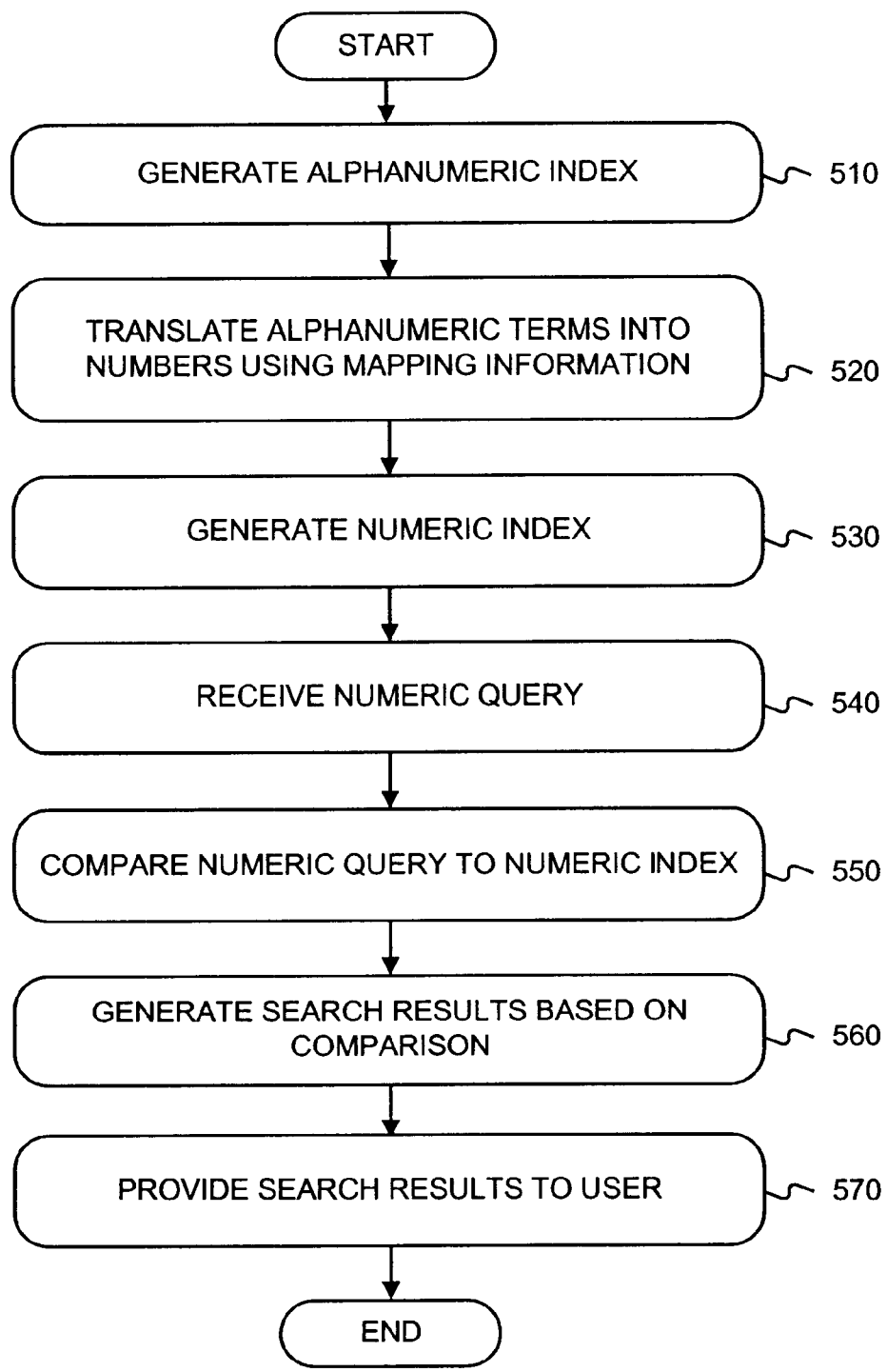
FIG. 5a illustrates a flow diagram, consistent with the invention, for providing search results in response to a numeric search query.

FIG. 5a illustrates a flow diagram, consistent with the invention, of a preferred technique for providing search results in response to a numeric search query, based on the documents and index shown in FIGS. 3 and 4a, respectively. For the sake of illustrative ease, FIG. 5a describes a particular technique for generating a numeric index based on the mapping of a standard telephone handset; but those skilled in the art will recognize that other techniques consistent with the invention may be used.

Figure 5B:
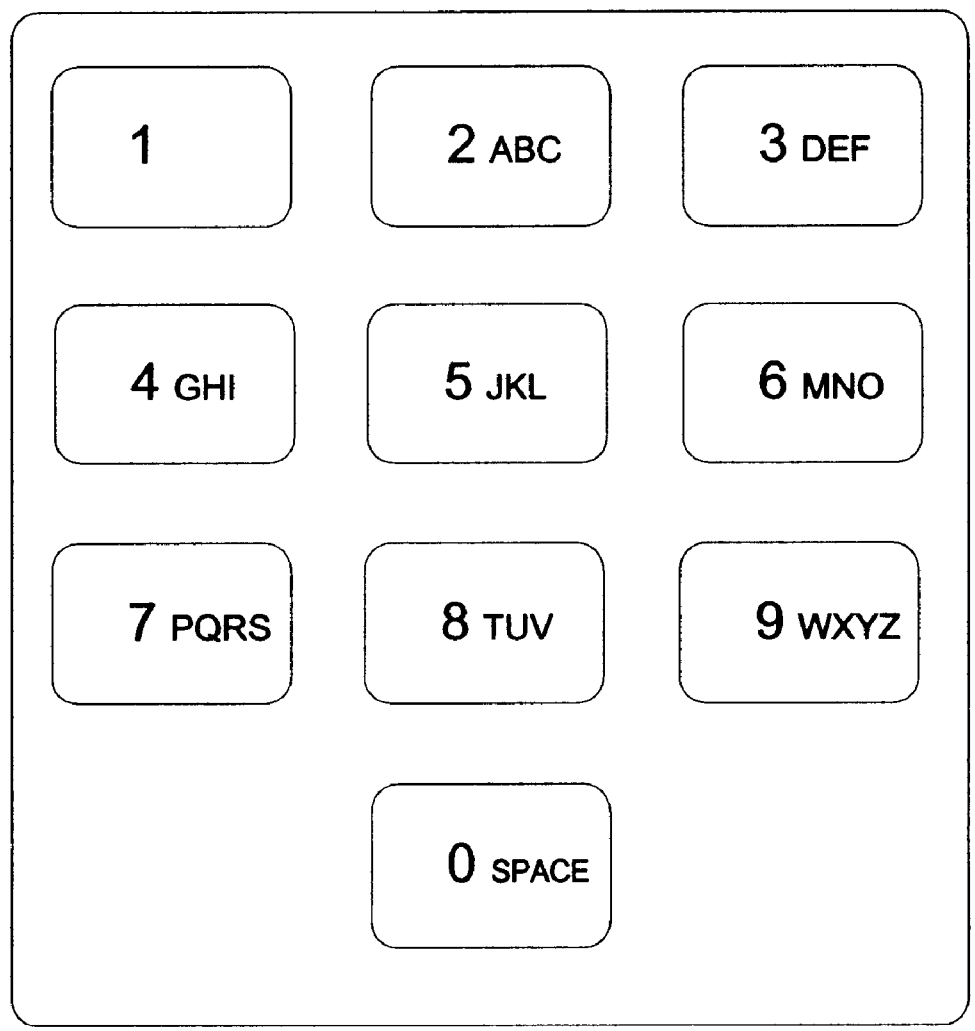
FIG. 5b illustrates a diagram for mapping alphanumeric information to numeric information.

At stage 510, an alphanumeric index is generated based on documents. For example, the index shown in FIG. 4*a* is generated based on the documents shown in FIG. 3. At stage 520, the alphanumeric terms in the index (i.e., in the first column) are translated into their numeric equivalents using mapping information corresponding to a standard telephone handset, shown in FIG. 5*b*. As shown in FIG. 5*b*, the letters "a", "b", and "c" each map to the number "1", the letters "p", "q", "r", and "s" each map to the number "7", and so forth. Using this mapping information, the alphanumeric term "car" is translated into the numeric term "227" ("c" is mapped to "2", "a" is mapped to "2", and "r" is mapped to "7"). Similarly, the other terms in the alphanumeric index are mapped to their numeric equivalents. As it happens, like the term "car", the term "bar" also translates to "227". "Champagne" translates to "242672463", the term "3" translates into "3", "items" to "48367", "rental" to "736825", "repair" to "737247", "video" to "84336", and "wine" to "8463".

At stage 530, a numeric index is generated based on the translated terms. An example of such a numeric index is shown in FIG. 5*c*. As can be seen from FIG. 5*c*, the numeric term "8463" corresponds to Document 3, just as did its alphanumeric equivalent "wine". Because the numeric index shown is more ambiguous than the alphanumeric index (due to the mapping technique used), the information derived from it may not be as precise as that derived from the alphanumeric index. For example, the numeric term "227" corresponds to both Document 1 and Document 3; the alphanumeric equivalent "car", however, only corresponds to Document 1; and the alphanumeric equivalent "bar" only corresponds to Document 3.

At stage 540, a numeric search query is received, such as the query "227" or the query "8463." At stage 550, the received numeric query is compared to the numeric index. Based on this comparison, search results are generated at stage 560 that identify documents that correspond to the numeric query. For example, the numeric index shown in FIG. 5*b* reveals that Documents 1 and 3 correspond to the numeric query "227" and that Document 3 corresponds to the numeric query "8463". At stage 570, the search results are provided to the user.

Note that due to the fact that the numeric index is more ambiguous than the alphanumeric index (e.g., both "car" and "bar" map to "227"), the search results may not be as precise as with the alphanumeric index. For example, if the user entered the alphanumeric search query "car", the alphanumeric index shown in FIG. 4*a* would yield Document 3 as a search result. This result is quite precise because it returns only the documents that correspond to (e.g., that contain) the term "car". A user seeking the same information with an input device having the mapping shown in FIG. 5*b* would obtain less precise results. If such a user sought information about "car", the user would enter "227", and would obtain both Documents 1 and 3 as search results. Document 3, however, is not relevant because it is unrelated to cars; it is returned only because it corresponds to the term "bar", which also maps to "227". In contrast, a user entering a numeric query of "8463" (corresponding to "wine") would receive as a search result only Document 3, which is the only relevant document. This is because no other documents contain an alphanumeric term that maps to "8463".

Although the description above is made in reference to mapping an alphanumeric index to a numeric index, those skilled in the art will recognize that other implementations are possible consistent with the invention. For example, in some cases the primary index used by search engine 125 may not be an alphanumeric index, but may instead be an index based on another type of information (such as numeric, phonetic, or audiovisual information); and the secondary index generated may not be a numeric index, but may instead be an index based on another information type.

Indeed, rather than translating a primary index to a secondary index, methods and apparatus consistent with the invention could generate a single index that contains information of the same type as that employed at the user's input device. Rather than obtaining a first set of information of a first type from a primary index, for example, this single index could be created by obtaining the first set of information of a first type directly from the documents that are to be searched.

In general, it is preferred that the mapping technique that is used to translate between the information type of the primary index (the "first information type") to the information type of the secondary index (the "second information type") be the same technique that is employed at the user's input device to map between the first information type and the second information type. There may, however, be instances where it is preferable to use a different mapping technique for the indices than is used for user input.

D. Conclusion

As described in detail above, methods and apparatus consistent with the invention provide tools that allow a user to display information interactively so that the user can explore the information to discover knowledge. The foregoing description of an implementation of the invention has been presented for purposes of illustration and description. Modifications and variations are possible in light of the above teachings or may be acquired from practicing the invention.

For example, although the foregoing description focuses on alphanumeric and numeric types of information, those skilled in the art will recognize that other types of information may be used consistent with the invention. Furthermore, the foregoing description describes an implementation where a separate numeric index is generated. In other implementations consistent with the invention, however, the numeric equivalents may be associated with their corresponding alphanumeric terms in a single index. Moreover, the foregoing description is based on a client-server architecture, but those skilled in the art will recognize that a peer-to-peer architecture may be used consistent with the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is therefore defined by the claims and their equivalents.

What is claimed is:

1. A method of providing search results to a user in response to an ambiguous search query, comprising:

generating a first index that associates (1) a first set of information of a first type with (2) documents that correspond to the first set of information;

translating the first set of information into a second set of information of a second type, based on mapping information;

generating a second index that associates, based on the mapping information, (1) the second set of information with (2) the documents;

receiving a search query of the second type;

generating search results by comparing the search query to the second index; and providing the search results to a user.

2. The method of claim 1, wherein the documents are pages from the world wide web.

3. The method of claim 1, wherein the documents are references to pages o n the world wide web.

4. The method of claim 1, wherein the search results comprise references to documents.

5. The method of claim 1, wherein the first type of information is alphanumeric information and the first index is an alphanumeric index.

6. The method of claim 5, wherein the second type of information is numeric information and the second index is a numeric index.

7. The method of claim 6, wherein the mapping information is based on a standard telephone keypad.

8. The method of claim 5, wherein the second type of information is phonetic information and the second index is a phonetic index.

9. The method of claim 5, wherein the second type of information is audio information and the second index is an audio index.

10. The method of claim 5, wherein the second type of information is visual information and the second index is a visual index.

11. A method of providing search results to a user in response to an ambiguous search query, comprising:

generating a first index that associates a first type of information with documents;

translating the first type of information into a second type of information based on mapping information;

generating a second index that associates the second type of information with the documents based on the mapping information;

receiving a search query containing the second type of information;

generating search results by comparing the search query to the second index; and providing the search results to a user.

12. A method of providing search results to a user in response to an ambiguous search query, comprising:

generating an alphanumeric index that associates alphanumeric strings with certain documents;

translating at least one alphanumeric string into a numeric string based on mapping information;

generating a numeric index that associates each translated numeric string with the documents based on the mapping information;

receiving a search query containing a string of numbers;

generating search results by comparing the search query to the numeric index; and providing the search results to a user.

13. The method of claim 12, wherein the search results comprise references to documents.

14. The method of claim 12, wherein an alphanumeric string is associated with a document if the document contains the alphanumeric string.

15. The method of claim 14, wherein the document is a page on the world wide web.

16. The method of claim 14, wherein the mapping information is based on a standard telephone keypad.

17. The method of claim 16, wherein the search query contains a string of numbers corresponding to a standard telephone keypad.

18. A method of providing search results to a user in response to an ambiguous search query, comprising:

obtaining a first set of information of a first type from a document;

translating the first set of information into a second set of information of a second type, based on mapping information;

generating an index entry that associates the second set of information with the document;

receiving a search query of the second type;

generating search results by comparing the search query to the index; and providing the search results to a user.

19. A computer-readable medium containing one or more instructions for providing search results to a user in response to an ambiguous search query, the comprising:

generating a first index that associates (1) a first set of information of a first type with (2) documents that correspond to the first set of information;

translating the first set of information into a second set of information of a second type, based on mapping information;

generating a second index that associates, based on the mapping information, (1) the second set of information with (2) the documents;

receiving a search query of the second type;

generating search results by comparing the search query to the second index; and providing the search results to a user.

20. An apparatus for providing search results to a user in response to an ambiguous search query, comprising:

at least one memory having program instructions, and at least one processor configured to execute the program instructions to perform the operations of:

generating a first index that associates (1) a first set of information of a first type with (2) documents that correspond to the first set of information;

translating the first set of information into a second set of information of a second type, based on mapping information;

generating a second index that associates, based on the mapping information, (1) the second set of information with (2) the documents;

receiving a search query of the second type;

generating search results by comparing the search query to the second index; and providing the search results to a user.

21. An apparatus for providing search results to a user in response to an ambiguous search query, comprising:

means for generating a first index that associates (1) a first set of information of a first type with (2) documents that correspond to the first set of information;

means for translating the first set of information into a second set of information of a second type, based on mapping information;

means for generating a second index that associates, based on the mapping information, (1) the second set of information with (2) the documents;

means for receiving a search query of the second type;

means for generating search results by comparing the search query to the second index; and means for providing the search results to a user.

* * * * *